Dec. 28, 1965    D. BOWMAN    3,225,998
APPARATUS FOR CLOSING THE ENDS OF PIPES
Filed June 18, 1962    7 Sheets-Sheet 1
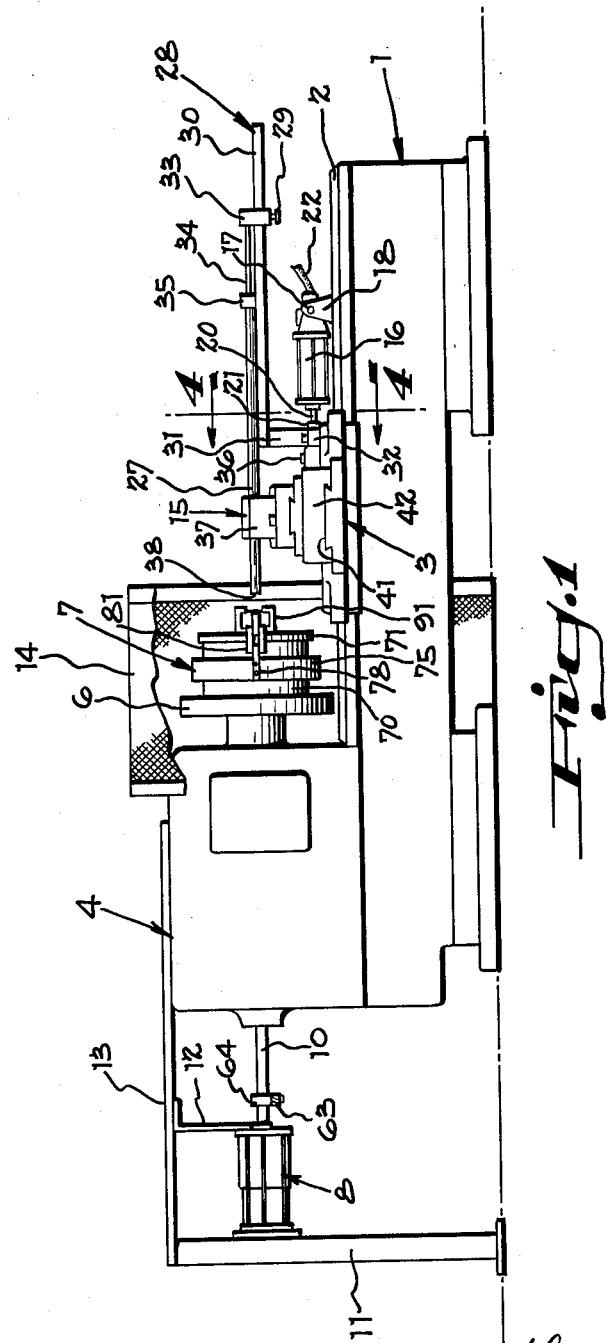
INVENTOR.
Dudley Bowman
BY
Wood, Herron & Evans.
ATTORNEYS.

Dec. 28, 1965 D. BOWMAN 3,225,998
APPARATUS FOR CLOSING THE ENDS OF PIPES
Filed June 18, 1962 7 Sheets-Sheet 2
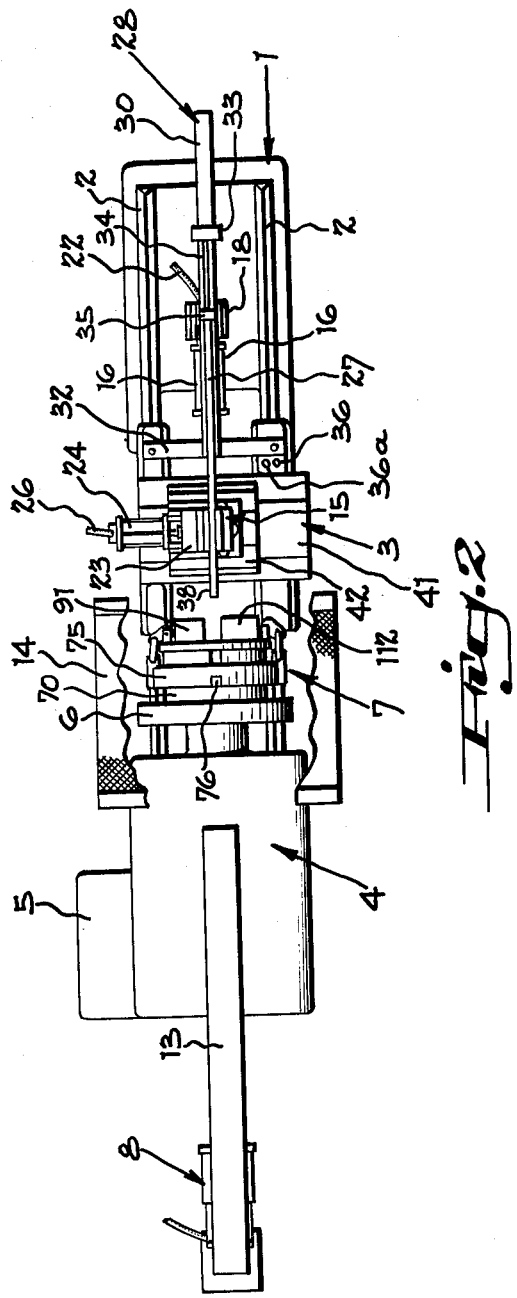
INVENTOR.
Dudley Bowman.
BY
Wood, Herron & Evans.
ATTORNEYS.

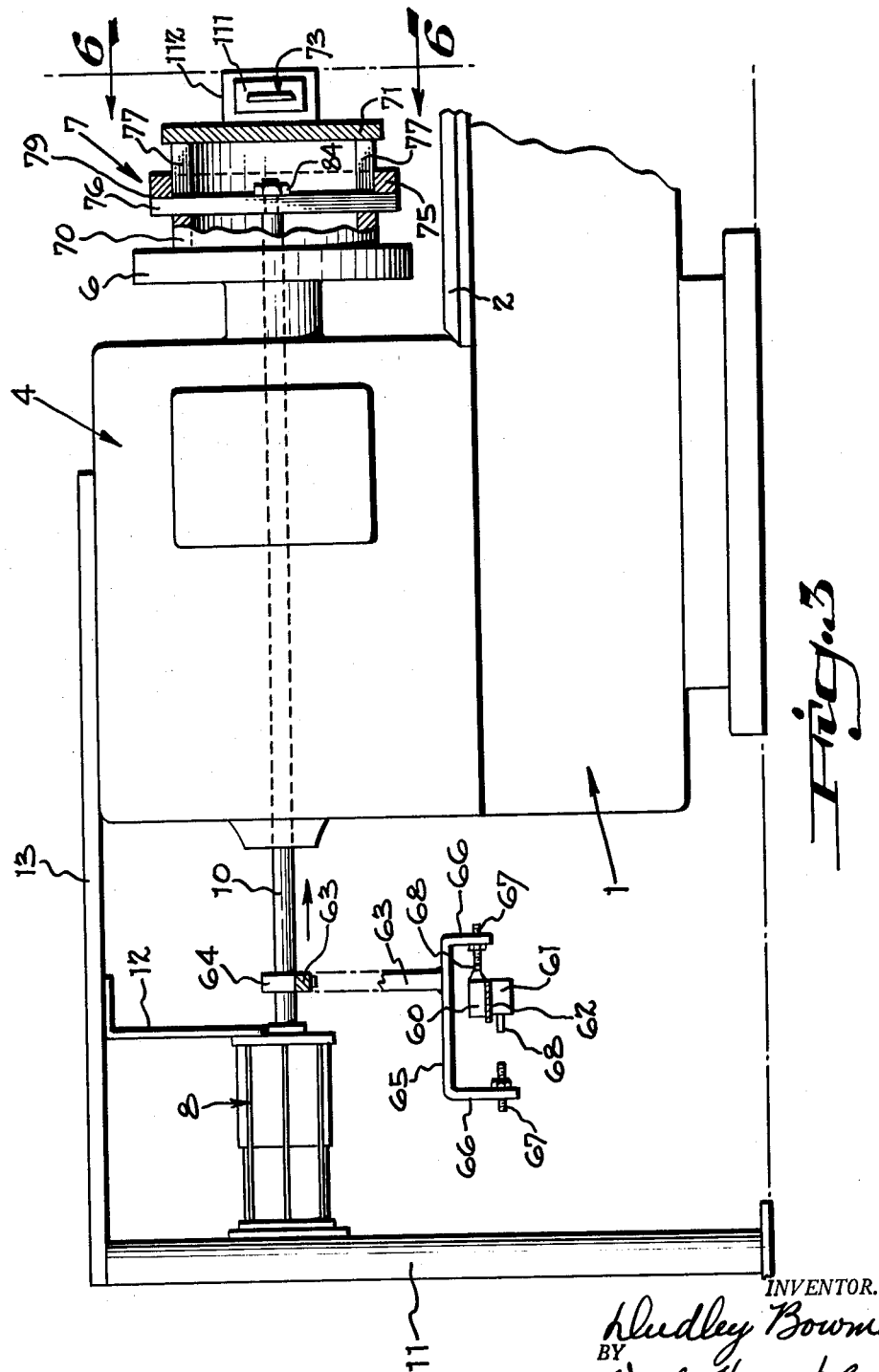

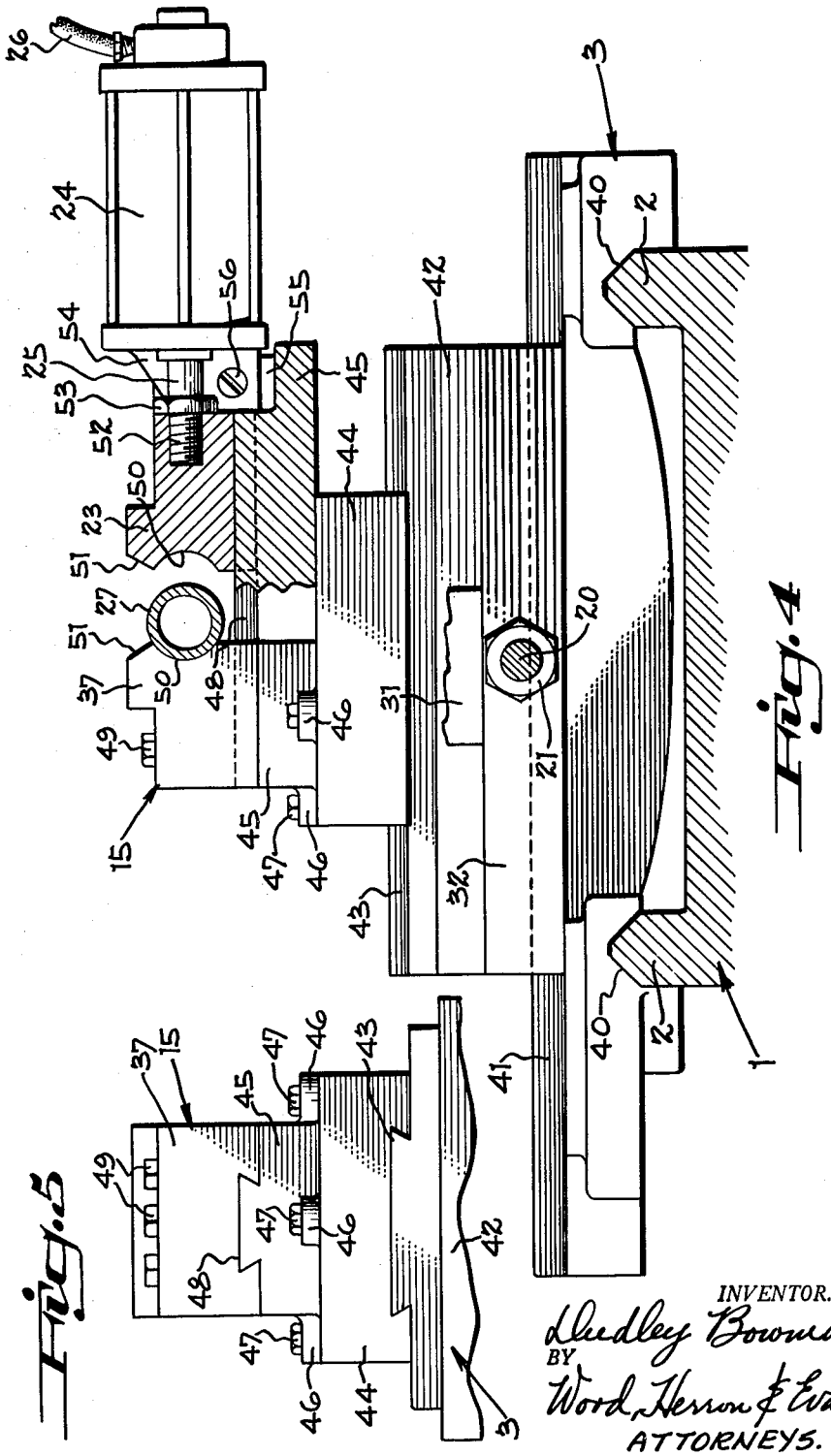

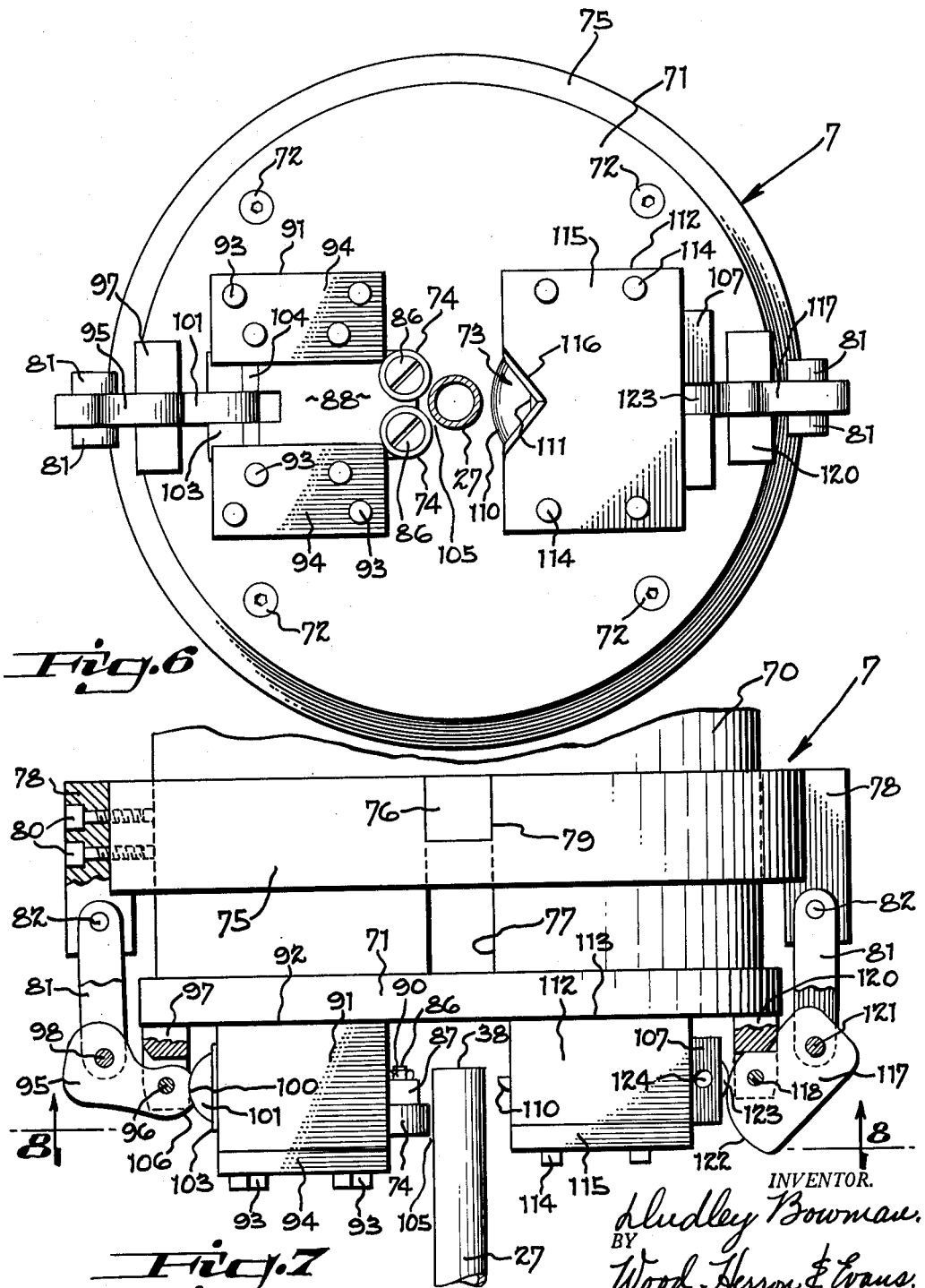

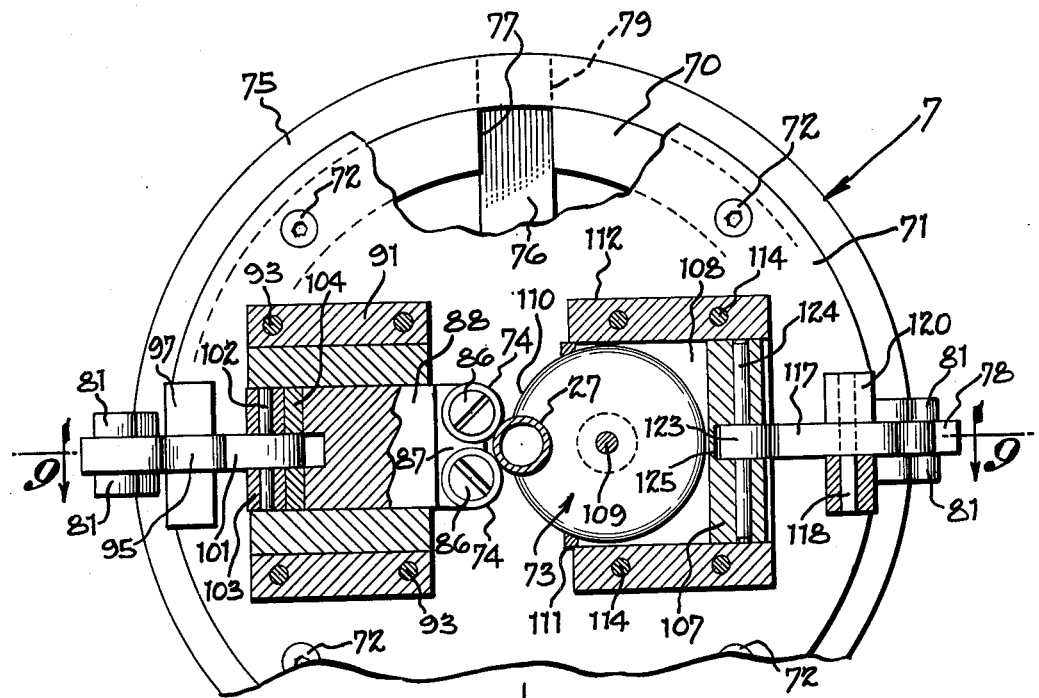

Dec. 28, 1965 D. BOWMAN 3,225,998
APPARATUS FOR CLOSING THE ENDS OF PIPES
Filed June 18, 1962 7 Sheets-Sheet 7

INVENTOR.
Dudley Bowman.
BY
Wood, Herron & Evans.
ATTORNEYS.

United States Patent Office 3,225,998
Patented Dec. 28, 1965

3,225,998
APPARATUS FOR CLOSING THE ENDS OF PIPES
Dudley Bowman, Lebanon, Ohio, assignor, by mesne assignments, to Gas Appliance Supply Corporation, Indianapolis, Ind., a corporation of Indiana
Filed June 18, 1962, Ser. No. 203,235
8 Claims. (Cl. 228—2)

This invention relates to a machine for swaging the end portion of a section of pipe to form a closed end, and to the method which is followed in forming the closure. Sections of pipe having a closed end of this type are used primarily as feed manifolds for gas ranges and also have other uses in industry.

In the past, two methods have been utilized in fabricating manifolds of this character. In one case, the end portion of the pipe is threaded externally and a closure cap is screwed tightly upon the threaded portion of the pipe. In another method, the end portion of the pipe is closed by a spinning operation, as disclosed in the patent to Winford L. Enghauser, No. 1,939,770, issued on December 19, 1933. In general, this machine operates upon the principle of forcing a swaging tool into frictional engagement with the end portion of the pipe which is spinning at a high rate of speed. The heat developed by the frictional engagement of the swaging tool renders the end portion of the pipe sufficiently malleable to allow the metal of the pipe wall to be swaged to the form of a rounded end wall which is gas tight.

In a later apparatus developed by Winford L. Enghauser, disclosed in Patent No. 2,754,705, issued on July 17, 1956, two pipe sections, each having a closed end are fabricated from a single length of pipe. In this apparatus the central portion of the pipe section is heated to a plastic state, then the pipe section is placed between a pair of rotatable swaging dies which include lobes arranged to constrict the heated portion of the pipe section during rotation of the swaging dies, while the pipe is rotated at relatively high speed. During this operation, the heated central portion of the pipe is progressively constricted and finally pinched off so as to form two lengths of pipe, each having a rounded end which is formed by the swaging action of the dies.

One of the primary objectives of the present invention has been to provide an apparatus and method for closing the end of a pipe section, whereby the pipe section remains stationary during the swaging or closing operation, while the swaging tools rotate in an orbit with respect to the end portion of the pipe, as distinguished from the apparatus which requires the pipe to be spun during the swaging operation.

By virtue of this principle, the apparatus is adapted to act upon pipe sections which are not straight but which may be configurated to curved or angular configuration prior to the closing operation. In other words, since the pipe section is not rotated or spun during the closing operation, but remains stationary, the section may be preformed to the desired configuration, then closed so as to avoid disrupting the closed end through subsequent pipe bending or other forming operations according to this aspect of the invention, the section of pipe to be closed is firmly clamped against rotation in a fixture which is mounted upon a shiftable carriage. The carriage, with the pipe clamped in it, is then advanced axially toward a rotating pipe closing head, with the axis of the stationary pipe located upon the axis of rotation of the head. The pipe enters the head with its endwise portion heated to a temperature sufficiently high to reduce the pipe wall to a plastic state.

The pipe closing head includes a rotatable closing disk which is mounted for radial motion relative to the axis of rotation of the head from a retracted position toward and beyond the axis of rotation of the head. During the pipe closing cycle, the closing disk rotates in an orbit with the head about the heated plastic end portion of the pipe and is progressively advanced radially toward and beyond its axis of rotation, which is common to the axis of the stationary pipe. The disk thus tracks upon the periphery of the pipe in a spiral path in a flat plane and progressively constricts the plastic wall of the pipe. The disk finally reduces the end portion of the cylindrical wall to the form of an end wall which forms a gas tight closure.

A further objective of the invention has been to provide an apparatus which forms a flat end wall on the pipe section, which is disposed at right angles to the axis of the pipe, as distinguished from the rounded ends produced by the pipe spinning apparatus utilized in the past. In the normal usage of the manifolds for gas ranges, a series of tapped holes are formed along the length of the pipe section to receive the nipples or fittings for threading in the burners of the gas range. The flat or square end provided by the present apparatus thus permits the endwise nipple to be located closer to the closed end of the pipe, thus reducing the length of the manifold required for a given range size.

A further objective of the invention has been to provide a simplified machine for closing the end of successive pipe sections in a rapid efficient manner. According to this aspect of the invention, the rotating closing head is provided with back-up rollers which track against the stationary pipe along one side to support the pipe against the force developed by the closing disk, which acts upon the opposite side of the pipe during the closing cycle. The back-up rollers and the closing disk, are shifted along their radial paths of motion by means of cams and links while rotating with the head. The cams are actuated in time with one another by an axially shiftable actuating ring which rotates with the closing head. The axial motion is imparted to the actuating ring by a fluid operated cylinder which is connected to the ring. The pipe clamping fixture, which rigidly clamps the pipe section, and the carriage which shifts the clamping fixture and pipe section into operative relationship with the closing head, are also actuated by respective fluid operated cylinders. Accordingly, the several components of the machine are operated rapidly in proper sequence with one another to clamp the individual pipe section, advance it into the closing head, perform the closing operation, then to withdraw the finished pipe from the head for delivery from the machine in a rapid efficient manner.

The various features and advantages of the invention will be more clearly apparent to those skilled in the art from the following description taken in conjunction with the attached drawings.

In the drawings:

FIGURE 1 is a general side view of a pipe closing machine illustrating the principles of the present invention.

FIGURE 2 is a top plan view of the machine shown in FIGURE 1.

FIGURE 3 is an enlarged fragmentary side view taken from FIGURE 1, illustrating the headstock of the machine.

FIGURE 4 is a cross sectional view, taken along line 4—4 of FIGURE 1, detailing the pipe clamping mechanism.

FIGURE 5 is a fragmentary end view of the clamping head, as projected from FIGURE 4.

FIGURE 6 is a face view of the pipe closing or ending head as viewed along line 6—6 of FIGURE 3, the operating components being shown in open, pipe-receiving position.

FIGURE 7 is a top plan view of the head as projected from FIGURE 6.

FIGURE 8 is a sectional view of the pipe ending head taken along line 8—8 of FIGURE 7. This view illustrates the components shifted inwardly to the closed position which they assume at completion of the pipe closing cycle.

FIGURE 9 is a sectional view taken along line 9—9 of FIGURE 8, further detailing the pipe closing mechanism.

General arrangement of the machine

Figure 10:
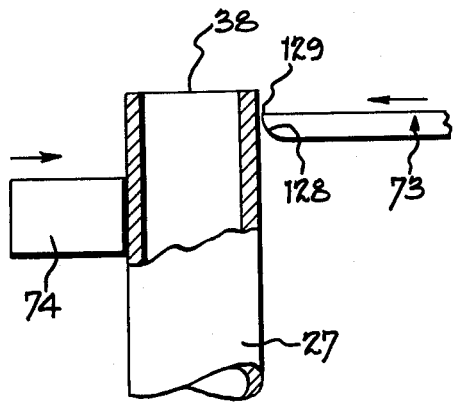
FIGURES 10–13 are diagrammatic views illustrating the motion of the pipe closing or ending disk with respect to the end portion of the pipe during the closing or pipe ending cycle.

The machine which has been selected to illustrate the principles of this invention, is generally similar to a metal turning lathe, with parts suitably modified to adapt the machine to the pipe closing or ending operation. The machine shown generally in FIGURES 1 and 2 is adapted to be controlled manually, that is, an operator feeds each length of pipe manually into the machine, then initiates the pipe closing cycle. Thereafter, the machine runs through its cycle in an automatic manner, then the operator removes the finished pipe and loads in the next pipe section to repeat the cycle. It will be understood, however, that it is contemplated to provide the machine with an automatic feeding apparatus, whereby the lengths of pipe are successively heated to the required working temperature, fed individually to the machine, then discharged after the pipe closing operation is completed, thereby providing complete automatic operation of the machine.

Described with reference to FIGURES 1 and 2, the machine comprises a bed, indicated generally at 1, including ways 2 slidably supporting a carriage, indicated generally at 3. A headstock, indicated generally at 4, is mounted upon one end portion of the bed and may represent a conventional speed change, gear-type lathe headstock, suitably modified, as explained below. As viewed in FIGURE 2, the headstock is driven by a motor 5 which is mounted directly on the headstock and in driving connection with the headstock spindle (not shown).

When equipped with a gear-type speed change transmission, the headstock speed change lever (not shown) is shifted to a selected speed for a given run of pipe (usually in the neighborhood of 400 r.p.m.). Other runs of pipe, due to the type of metal, the diameter of the pipe, or other factors, may require a different spindle speed, which may be selected by operating the speed selector lever. Since the speed change transmission of the headstock does not form an essential part of the invention, it has been omitted from the disclosure. It will be understood that the speed change headstock gearing may be omitted simply by providing a variable speed motor which is belted directly to the spindle, or by providing a variably speed V-belt pulley system in direct driving connection between the spindle and motor.

The headstock spindle includes a face plate 6 upon which is mounted the pipe closing or ending head, indicated generally at 7. As explained later, the pipe ending head 7 rotates with the face plate during the operating cycle and includes a pipe ending disk and back-up rollers which act upon the end portion of the pipe to form the closed end, as explained later. In order to actuate the disk and rollers during the pipe closing cycle, there is provided an operating cylinder, indicated generally at 8 (FIGURE 1), which is preferably air operated, and which includes a piston rod 10 connected with the components of the closing head, as explained later.

The cylinder 8 (FIGURES 1 and 3) is mounted upon a vertical post 11 rising from the floor and is braced by a bracket 12 depending downwardly from a horizontal support bar 13, which spans the headstock 4 and post 11. Bar 13 is arranged to resist the force generated by the cylinder 8. In order to accommodate the piston rod 10, the headstock spindle includes an axial bore through which the piston rod 10 passes, its forward end being rotatably connected to the pipe closing head mechanism 7, adapting the closing head to rotate relative to the piston rod.

In order to protect the operator, and to prevent metallic slugs from being thrown from the rotating closing head 7 during the cycle of operation, there is provided a protective shield 14 (FIGURES 1 and 2) which rises from the floor and surrounds the closing head 7. Shield 14 preferably is formed of wire mesh of a suitable grade, the structure being generally in the form of an inverted U straddling the lathe bed and having its lower ends secured to the floor.

The shiftable carriage, previously indicated at 3, includes a pipe clamp fixture indicated generally at 15 (FIGURES 1 and 4), into which the sections of pipe are introduced at the beginning of each cycle. As explained later, the pipe clamp includes a power-operated jaw which engages the pipe and positions it in axial alignment with the axis of rotation of the closing head 7, with the heated end of the pipe spaced outwardly from the head at the start of the cycle, as in FIGURE 1. After the cycle is initiated, the carriage 3 and pipe clamp fixture 15, as a unit, is shifted axially toward the closing head, so as to locate the heated end portion of the pipe in the operating zone of the pipe closing head 7.

In order to shift the carriage and pipe clamp from the retracted position shown in FIGURE 1 to the extended working position (FIGURE 7), there is provided a power cylinder 16 pivotally connected as at 17 to a bracket 18 rising from the bed 1. The forward end of cylinder 16 includes a piston rod 20 connected as at 21 to the carriage 3, arranged to shift the carriage and pipe clamp to the retracted and advanced positions along the ways 2 of the bed. Cylinder 16 is also air operated, air pressure being supplied to the rearward end of the cylinder by way of the conduit 22 to shift the carriage to its advanced position. Air pressure is supplied to the opposite end of the cylinder 16 by a similar conduit (not shown) so as to shift the carriage to its retracted position, as shown in FIGURE 1.

As best shown in FIGURE 4, the movable jaw 23 of the pipe clamp fixture 15, which is shown in the retracted position, is actuated by a cylinder 24, which is also preferably air operated. This cylinder is connected to a stationary portion of the clamp fixture 15 (as explained later) and includes a piston rod 25 which is connected to the movable jaw 23. Air pressure is supplied to cylinder 24 by way of a conduit 26 for shifting the jaw in clamping direction. A similar conduit (not shown) is in communication with the forward end of the cylinder and arranged to shift the piston and jaw 23 to the open or retracted position shown in FIGURE 4.

The stroke of the carriage and pipe clamp fixture, as a unit to its retracted and advanced positions is fixed. Therefore, in order to located the end portion of the pipe axially with respect to the pipe closing head 7, the length of pipe, indicated at 27 in FIGURE 1, must be located axially with respect to the pipe clamp fixture 15 when the length of pipe is placed in the machine. For this purpose, the carriage 3 includes a pipe gauge, indicated generally at 28, which provides an abutment surface engageable with the rearward end of the section of pipe when it is placed in the clamp fixture 15. Since the stroke of the clamp fixture 15 is fixed, and the pieces of pipe to be closed are of uniform length, the heated forward end portion of each pipe section is properly located with respect to the closing head when the pipe clamp is shifted from the retracted to the advanced working position.

As best shown in FIGURES 1 and 2, the pipe gauge 28 comprises a horizontal bar 30 extending in cantilever fashion from a vertical bracket 31 which includes a cross piece or foot 32 attached to the rearward portion of the carriage 3. The horizontal bar 30 includes an adjustable gauge block 33 slidably mounted on bar 30 and including a clamping screw 29 adapted to clamp the block 33 in its adjusted position along the bar 30. A rod 34 projects forwardly from the gauge block 33 and the outer end of rod 34 includes a head 35 which forms a gauge surface for the rearward end of the length of pipe 27. The upper surface of the horizontal bar 30 is located vertically in a plane to support and align the length of pipe 27 axially with respect to the axis of rotation of the pipe closing head 7.

In setting up the machine for pipe sections of a given length, the clamp block 33 is adjusted along the horizontal bar 30 to accommodate for the pipe length. In other words, the parts are so adjusted that the forward heated end of the pipe is spaced outwardly from the head 17 a distance corresponding to the forward stroke of the carriage (with the carriage retracted—FIGURE 1). The set-up is such that the end portion of the pipe is properly related to the closing mechanism when the carriage and the pipe section are shifted to the advanced working position. Thus, after the gauging device is properly adjusted for a given pipe length, the closed end is formed on the successive pipe sections at the same point so as to produce closed pipe sections of uniform length in the successive cycles of operation.

Cycle of operation

As noted above, the carriage 3 resides in the retracted position shown in FIGURE 1 at the end of each cycle of operation, with the shiftable clamp jaw 23 shifted to the open position shown in FIGURE 4. At the start of the cycle the operator places the section of pipe 27 upon the gauge bar 30 with its rearward end in abutment with the gauge head 35, as noted above. Thereafter, the operator depresses a manually operated push button 36 (FIGURE 2) which initiates the cycle of operation. The push button switch is interconnected in an electrical control circuit, including limit switches which are shifted in response to the operation of the carriage 3, pipe closing head 7, and shiftable jaw 23 to provide operation of these parts in proper sequence. The control circuit includes electrically operated valves which respond to the tripping of the limit switches, the valves being arranged to admit air pressure to the actuating cylinders 8, 16 and 24 during the cycle of operation. The control system does not form an essential part of the invention; therefore, it has been omitted from this disclosure. It will be understood that the operation of the several cylinders can be regulated manually if desired, in which case the control system is omitted.

The main motor 5 is energized continuously during the operation of the machine so as to avoid stopping and starting the pipe closing head 7 during each cycle. It will be understood that the end portion of each pipe section, which is to be closed, is heated to a temperature in the neighborhood of 1800–2000° F., which has been found to reduce the metal to a suitable plastic condition for the forming or forging action carried out by the closing head 7. The heating process preferably is carried out by an induction heating apparatus, although it is also contemplated to heat the pipes in a gas-fired furnace. The mode of heating the pipes does not form a part of the present invention.

Assuming that the machine cycle is regulated by the electrical control system, operation of the push button 36 by the operator energizes the clamp piston 24, causing the movable jaw to be shifted into clamping engagement with the pipe section 27 which is positioned axially by the gauge head 35 and laterally by the fixed jaw 37 (FIGURE 4). Upon reaching its clamping position, jaw 23 trips a limit switch (not shown) which energizes the carriage cylinder 16, causing the carriage, with the clamped pipe section, to be shifted from the retracted position to the advanced position of FIGURE 7, thereby bringing the heated end portion 38 of the pipe axially into the working zone of the closing head 7.

When the carriage reaches its advanced position, it trips a second limit switch (not shown) of the control circuit and causes air pressure to be applied to the cylinder 8, which regulates the advancement of the back-up rollers and closing disk of the closing head 7, causing the heated end portion 38 of the pipe to be closed, as explained later, thus completing the cycle. At this point, a second push button 36a of the manual switch may be depressed by the operator to retract the components of the closing head 7 (cylinder 8). The carriage 3 is then retracted (cylinder 16) so as to withdraw the closed pipe from the closing head 7. Thereafter, the clamp jaw 23 is retracted (cylinder 24) to release the finished pipe section 27, thereby conditioning the machine for the next cycle of operation.

Carriage and pipe clamping fixture

Described in detail with reference to FIGURES 4 and 5, the carriage 3 comprises a one-piece rigid casting of conventional design, having V-shaped grooves 40 formed in its lower surface slidably interfitting the upper surface of the ways 2 of the bed. The upper surface of the carriage is provided with a dovetail rail 41 extending transversely of the bed, a cross slide 42 being slidably interfitted upon the dovetail 41 and held rigidly in adjusted position by clamping means (not shown). The cross slide 42 also includes a dovetail rail 43, parallel with the rail 41 and slidably supporting a clamp block 44 upon which is mounted the pipe clamp fixture, previously indicated at 15. The clamp block 44 is rigidly clamped in centered position with respect to the cross slide 42.

The pipe fixture 15 is bolted to the clamp block 44 and comprises a base section 45 including lugs 46 seated upon the clamp block 44 and secured thereto by screws 47. The base section 45 includes a dovetail rail 48, and the fixed clamp jaw 37 interfits the rail 48 and is secured rigidly in place by screws 49. The fixed jaw 37 includes, in its clamping face, an arcuate groove 50, the radius of which corresponds to the radius of the pipe section 27. The upper portion of the jaw has an outwardly inclined section 51 leading to the groove 50 to facilitate the insertion of the pipe into the clamp. If the machine is set up for a run of pipe having a different diameter, then the fixed jaw 37 may be replaced with one having a groove radius matching the new pipe size. The fixed jaw 37 is located transversely as to the carriage so as to align the axis of the pipe section with the axis of rotation of the pipe closing head 7.

The movable clamp jaw 23 is slidably mounted upon the dovetail rail 48 and is provided with a working face corresponding to the fixed jaw, including the groove 50 and inclined portion 51. In order to connect the clamp cylinder 24 to jaw 23, the piston rod 25 includes a threaded portion 52 engaged in a bore formed in the movable jaw, the piston rod being locked in place by a nut 53 threaded on the rod portion 52. In order to connect the cylinder 24 to the base section 45, the forward portion of the cylinder is provided with a pair of lugs 54 interfitting a mating pair of lugs 55 rising from the rearward portion of the base section 45. A screw 56 passes through the lugs so as to anchor the cylinder to the base section. It will be understood that movable jaw 23 may also be interchanged to suit the various pipe diameters by removing the cylinder and attaching a jaw 23 on the piston rod which has a groove 50 of the proper radius.

Pipe closing head

As noted earlier, the closing head 7 (FIGURE 3) is mounted upon the face plate 6 of the headstock 4. During the closing cycle, the components of the pipe closing head are shifted through the operating cycle by the cylinder 8 by way of a piston rod 10, which passs through the hollow spindle of the headstock. The range of motion of the pipe closing components is regulated by a pair of electrical switches 60 and 61, which are mounted in a fixed position upon a bar 62 at the rearward end of the headstock 4. The switches 60 and 61 are interconnected with the electrical control system and are arranged to control the admission of air pressure to the opposite ends of the cylinder 8 at the limits of piston travel.

The switches 60 and 61 are actuated by a trip bar 63 (FIGURE 3) which is clamped as at 64 at an adjusted position along the length of piston rod 10. The lower end of bar 63 includes a U-shaped bracket 65 having vertical switch actuating arms 66—66. The lower portion of each arm includes an adjustment screw 67 arranged to engage and trip the stems 68—68 of the switches 60 and 61. After the operator initiates the cycle of operation (by depressing the push button 36), and the carriage 3 shifts the clamped pipe section axially into the pipe closing head 7, then the control system applies air pressure to the rearward end of cylinder 8 to shift the pipe closing components of the head through the pipe closing stroke. When the limit of forward motion is reached (FIGURE 13), the left hand adjustment screw 67 (FIGURE 3) trips the stem 68 of switch 61 (FIGURE 3) to limit the motion of the closing head components. When the operator depresses push button 36a to retract the components, the system applies air pressure to the forward end of cylinder 8, causing the pipe closing mechanism to be retracted to the normal position shown in FIGURE 6. When the components of the closing head 7 are thus fully retracted, the right hand adjustment screw 67 trips the stem of switch 60 to deenergize the cylinder 8 with the components retracted.

Described in detail (FIGURES 3 and 6–9), the pipe closing head includes a cylindrical collar 70 which is permanently attached to the face plate 7 concentric with the axis of rotation of the face plate. The outer end of the cylindrical collar 70 includes a circular mounting plate 71 which is secured by screws 72 (FIGURE 6) to the end of collar 70. The pipe closing disk 73 is carried by the plate 71 for rotary and orbital motion with the plate 71 and is arranged to shift radially relative to the axis of the plate, as explained later. The disk 73 resides in the retracted position shown in FIGURE 6 relative to the length of pipe 27 at the start of the cycle. Back-up rollers 74—74 are carried by plate 71 for orbital motion and rotation adjacent one another on the side of the pipe opposite the disk 73. The back-up rollers 74—74 also reside in the retracted position of FIGURE 6 at the start of the cycle to permit the heated end 38 of the pipe section 27 to be inserted into the working zone of the pipe closing head 7. The position of the closing disk 73 and back-up rollers 74 in FIGURE 6 corresponds to the position of the parts shown in FIGURE 3.

The closing disk 73 and back-up rollers 74—74 are shifted during the pipe closing cycle from the position of FIGURE 6 to the position of FIGURE 7 by an actuating ring 75 which slidably encircles the cylindrical collar 70. The actuating ring 75 is interconnected by means of links and cams with the closing disk 73 and back-up rollers 74, as explained later. The actuating ring (FIGURE 3) is connected to the piston rod 10 by a yoke or crosshead 76 extending diametrically through the cylindrical collar 70 and having outer endwise portions slidably passing through slots 77 formed in the collar 70. The portions of the crosshead 76 which project beyond the periphery of the collar 70 are attached as at 79 (FIGURE 8) to the actuating ring at diametrically opposite sides.

In order to shift the closing disk 73 and back-up rollers 74 relative to the pipe section 37, the actuating ring 75 (FIGURE 7) is provided with a pair of pivot blocks 78—78 attached by screws 80 to the ring 75. The pivot blocks are located at diametrically opposite sides of the ring along a line disposed at right angles to the crosshead 76. Respective pairs of links 81 are pivotally connected as at 82 to each of the pivot blocks 78. The pairs of links are arranged to actuate the cams which shift the closing disk and back-up rollers in response to the axial motion of piston rod 10, as explained in detail below.

As noted earlier, the face plate 6 is rotated continuously during the successive pipe closing operations. The cylindrical collar 70, including the crosshead 76 and other components of the closing head, also rotate as a unit with the face plate 6. In the present arrangement, the crosshead 76 is adapted to rotate relative to the piston rod 10. For this purpose, the forward portion of the piston rod is counterturned as at 83 (FIGURE 9) to provide a journal rotatably passing through the crosshead 76. The crosshead is confined endwisely upon the piston rod by a nut 84, the crosshead bearing is loosely engaged between the nut 84 and the shoulder 85 which is delineated by the counter turned portion of the piston rod 10.

The back-up rollers 74 (FIGURES 8 and 9) are rotatably mounted upon respective screws 86—86 which pass through a flange 87 projecting from the inner end of a slide block 88. The screws 86 are locked in adjusted position by respective nuts 90. The slide block 88 is shiftably confined in a bearing block 91 which is generally U-shaped in cross section with its base section 92 seated against and secured to the circular mounting plate 71 by screws 93. The slide block 88 is confined in the bearing block 91 by a pair of retainer plates 94—94, which are also secured by the screws 93.

The slide block 88 and its back-up rollers 74 are shifted along a line radial to the axis of rotation of the closing head from the retracted position (FIGURES 6 and 7) to the advanced position (FIGURES 8 and 9) by the cam 95, which is rocked by the actuating ring 75. As best shown in FIGURE 7, cam 95 is pivotally mounted as at 96 in a forked bracket 97 which is secured to the circular mounting plate 71. The outer portion of cam 95 is pivotally connected as at 98 to the link 81 which, as previously noted, is connected to the actuating ring 75. The cam 95 includes a recessed dwell portion 100 which normally nests with a roller 101 in the retracted position of the back-up rollers, as shown in FIGURES 6 and 7.

As shown in FIGURES 8 and 9, the roller 101 is rotatably mounted as at 102 in a bearing block 103 which is attached to the outer end portion of the slide block 88. In order to accommodate for the diameter of the pipe section 27, the block 103 seats against a replaceable shim 104 engaged against the outer end of the slide block 88. It will be understood that if the machine is set up to operate upon pipe sections having a diameter greater than that shown in FIGURES 6–9, a shim having a thickness less than that shown is installed in the slide block 88. On the other hand if the pipe sections have a smaller diameter than that illustrated, then a shim having a greater thickness is installed. This is accomplished by removing the retainer plates 94 which are bolted to the bearing block 91.

It will be understood that the dwell recess 100 of cam 95 locates the back-up rollers 74 in a slightly retracted position, providing the clearance 105 (FIGURES 6 and 7) when the actuating ring 75 is in the retracted position shown. The portion of the cam 95 leading from the dwell recess 100 preferably is concentric as at 106 to the pivot pin 96, such that the back-up rollers simply move forward a sufficient distance to engage the periphery of the pipe as the actuating ring 75 moves forwardly from the position of FIGURE 7 to the position FIGURE 9. In other words, the back-up rollers 74 remain stationary after initially engaging the periphery of the pipe, while the pipe closing disk 74 progressively advances across the diameter of the pipe during the outward motion of the actuating ring.

As best shown in FIGURES 8 and 9, the closing disk 73 is rotatably mounted as at 109 in a slide block 107, which is generally similar to the slide block 88 of the back-up rollers. Slide block 107 is slotted as at 108 (FIGURE 9) to receive the closing disk 73, with a portion 110 of the disk projecting outwardly beyond the inner end of the block and arranged to act upon the pipe. A scraper plate 111 is attached to the outer face of slide block 107 and is slotted to accommodate the outer portion of the closing disk 73. The opposite sides of the slot slidably embrace the opposite flat faces of the disk to provide a wiping action with respect to the rotating disk. The wiping action removes the scale which forms on the heated end portion 38 of the pipe section and which tends to adhere to the opposed faces of the disk.

The slide block 107 is shiftably confined for radial motion relative to the axis of head 7 in a bearing block 112, generally similar to the bearing block 91 of the back-up rollers. The bearing block 112 is generally U-shaped in cross section with its base portion 113 (FIGURE 9) seated against the mounting plate 71 and secured in place by screws 114. The slide block 107 is slidably confined within the bearing block by a retainer plate 115 which is also secured to the bearing block by the screws 114. As viewed in FIGURE 6, the retainer plate 115 includes, at its leading edge, a V-shaped notch 116, which provides clearance for the portion 110 of the disk as the disk passes through the heated end portion 38 of the pipe during the closing cycle.

The slide block 107, with its rotatable closing disk 73, is shifted along its radial path from the retracted position (FIGURES 6 and 7) to the advanced position (FIGURES 8 and 9) by a cam 117 which is also operated by the actuating ring 75. Cam 117 is pivotally mounted as at 118 in a forked bracket 120, which is secured to mounting plate 71, similar to the bracket 97, previously described. The outer portion of cam 117 is pivotally connected as at 121 to the second link 81 of the actuating ring 75 in the manner described earlier with reference to the back-up roller structure. The cam 117 includes an eccentric working surface 122 which acts upon a cam roller 123. Roller 123 is rotatably mounted upon a pin 124 projecting through the rearward portion of the slide block 107. This portion of the slide block is slotted as at 125 to accommodate the roller 123.

*Operation of closing head*

As noted earlier, the closing head 7 and its components rotate continuously while the machine is in operation. Centrifugal force, which is generated by this rotary motion, acts upon the slide blocks 88 and 107, and their associated parts, thus forcing these elements normally to the retracted position shown in FIGURES 6 and 7. When air pressure is applied to the rearward end of cylinder 8 to force the actuating ring 75 forwardly, the slide blocks are forced inwardly toward one another counter to the centrifugal force, as indicated by the arrows in FIGURE 9.

Figure 13:
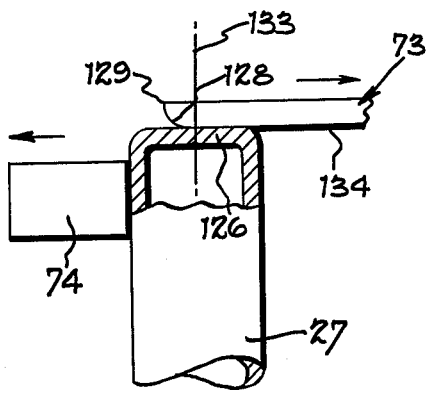

During the initial forward motion of the actuating ring 75, the recessed dwell portion 100 of the back-up roller cam 95 swings out of nested relationship to its roller 101, to shift the back-up rollers from the retracted position (FIGURE 6) to the advanced position (FIGURE 8) engaging the periphery of the pipe. The rollers remain in this position throughout the remainder of the stroke of ring 75 by virtue of the concentric working face 106 of the cam 95, as noted earlier. During continued forward motion of the actuating ring, the cam 117, by virtue of its working face 122, which is eccentric to the pivot rod 118, progressively advances the closing disk 73 toward and across the axis of the stationary pipe 27 until the disk 73 reaches its limit of travel shown in FIGURE 9, at which point the closed end 126 is formed on the pipe (FIGURE 13). It will be understood that the back-up rollers 74, which remain in tracking engagement with the periphery of the stationary pipe, sustain the pipe against the force of the closing disk as it progressively acts upon the opposite side of the pipe. Both the back-up rollers and closing disk rotate about their own centers while in tracking engagement with the pipe and while moving in an orbit about the central axis of the stationary pipe.

The action of the closing disk 73 and back-up rollers 74 is disclosed diagrammatically in FIGURES 10–13. The position of the parts in FIGURE 10 represents the initial portion of the cycle, wherein the back-up rollers 74 have been moved into tracking engagement with the heated end portion 38 of the stationary pipe section 27, while rotating in an orbit about the axis of the stationary pipe. At this time, the closing disk 73, also moving in an orbit in unison with the back-up rollers, approaches the periphery of the pipe. Continued radial motion of the disk 73 (FIGURE 11) brings the working edge of the disk into tracking engagement with the periphery of the heated, endwise portion 38 of the pipe.

Figure 11:
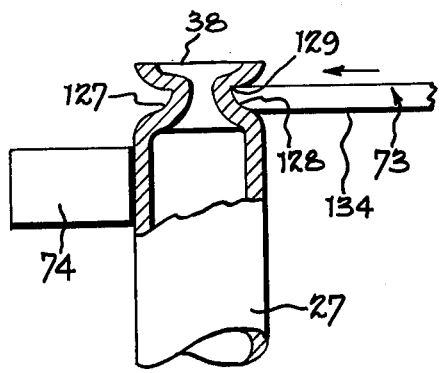
Figure 12:
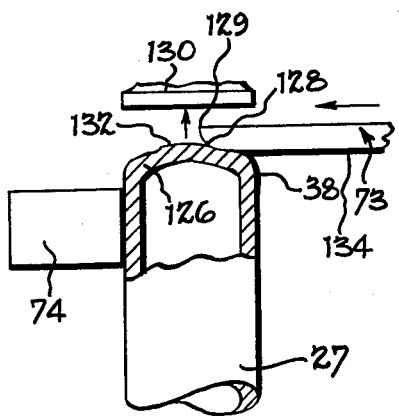
Figure 14:
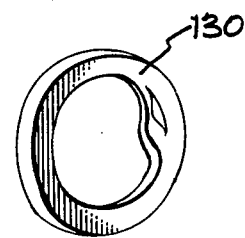
FIGURE 14 is a perspective view illustrating a typical piece of scrap which is severed from the pipe during the pipe closing cycle.

As the disk engages the pipe it begins to rotate while moving in a spiral path in a flat plane toward the central axis of the pipe, thus progressively constricting the end portion, as indicated at 127 (FIGURE 11). It will be noted that the working edge of the closing disk is curved as at 128, as viewed in profile, providing a sharp edge 129 along one side of the disk. As the edge of the disk approaches the axis of the pipe, which is common to the axis of rotation of the closing head 7, the edge 129 severs the constricted portion 127, to form a slug 130 (FIGURES 12 and 14) which drops from the machine.

At this state (FIGURE 12) the plastic portion 38 of the pipe has been swaged to form the closed end 126, which is slightly convex, as indicated at 132. Continued motion of the working edge of the disk across and beyond the axis 133 of the pipe (FIGURE 13) causes the curved edge 128 and flat face 134 of the disk to create a wiping action with respect to the closed end so as to flatten the end, as indicated at 120 in FIGURE 13, thus completing the cycle. Thereafter, the disk 73 and back-up rollers 74 are retracted, as indicated by the arrows, the finished pipe is withdrawn from the closing head as described earlier.

Having described my invention, I claim:

1. A machine for closing an end of a pipe section by progressively swaging a heated end portion thereof comprising, a frame, a rotatable pipe closing head mounted on the frame, means for clamping the pipe section against rotation with the heated end portion thereof presented to said head and with the longitudinal axis of the pipe section located substantially in alignment with the axis of rotation of the head, a pipe closing element mounted on said head for rotation therewith and for motion from a retracted position along the head toward and across the axis of rotation of said head, and back-up means mounted on the head for rotation therewith, said back-up means mounted in a position opposite to the said closing element and adapted to engage the periphery of the pipe section on the side opposite the closing means during the motion of the closing element toward and across the axis of rotation of the head, whereby the closing element is adapted to swage the heated end portion of the stationary pipe section to the form of an end wall having a substantially flat external surface disposed at right angles to the longitudinal axis of the pipe section while the back-up means support the end portion of the pipe against the pressure applied thereto by the closing element.

2. A machine for closing an end of a pipe section by progressively swaging a heated end portion thereof comprising, a frame, a rotatable pipe closing head mounted on the frame, a pipe clamping fixture mounted on the frame for motion along a line generally parallel to the axis of rotation of the head, said fixture adapted to clamp a pipe section against rotation with the longitudinal axis of the pipe section located substantially in alignment with the axis of rotation of the head, means connected to the pipe clamping fixture for advancing the same from a retracted position along said axis to an advanced position with the heated end of the pipe section presented to the rotating pipe closing head, a pipe closing element mounted on said head for rotation therewith and for motion from a retracted position along the head toward and across the axis of rotation of said head, thereby to swage the heated end portion of the stationary pipe section to the form of an end wall having a substantially flat external surface disposed at right angles to the longitudinal axis of the pipe section.

3. A machine for closing an end portion of a pipe section by progressively swaging a heated end portion thereof comprising, a frame, a rotatable pipe closing head mounted on the frame, means for gripping the pipe section in a non-rotatable position with the heated end portion presented to said head and with the longitudinal axis of the pipe section located substantially in alignment with the axis of rotation of the head, a pipe closing element mounted on said head for rotation therewith and for motion along an axis which is generally radial to the axis of rotation of the head, back-up means mounted on said head on the side thereof opposite side pipe closing element, said back-up means mounted for motion along a line generally radial to the axis of rotation of said head, said closing element and back-up means normally residing in a retracted position relative to the axis of rotation of the head, and power means connected to said closing element and back-up means, said power means adapted to shift said back-up means from a retracted position into engagement with the end portion of the pipe section to support the same transversely, said power means adaped to shift said closing element from a retracted position toward and across the axis of rotation of said head, thereby to swage the heated end portion of the stationary pipe section to the form of an end wall having a substantially flat external surface disposed at right angles to the longitudinal axis of the pipe section.

4. A machine for closing an end portion of a pipe section by progressively swaging a heated end portion thereof comprising, a frame, a rotatable pipe closing head mounted on the frame, means for gripping the pipe section against rotation with the heated end portion thereof presented to the head and with the longitudinal axis of the pipe section located substantially in alignment with the axis of rotation of the head, a pipe closing disk rotatably mounted on said head for rotation therewith and for motion along an axis which is generally radial to the axis of rotation of the head, a pair of back-up rollers rotatably mounted on said head on the side opposite side pipe closing disk, said back-up rollers mounted for rotation with the head and for motion along a line generally radial to the axis of rotation of said head, said closing disk and back-up rollers normally residing in a retracted position relative to the axis of rotation of the head, and power means connected in common to said closing disk and back-up rollers, said power means adapted to shift said back-up rollers from the retracted position into tracking engagement with the end portion of the pipe section to support the same transversely, said power means adapted to shift said closing disk from the retracted position toward and across the axis of rotation of said head, thereby to swage the heated end portion of the stationary pipe section to the form of an end wall having a substantially flat external surface disposed at right angles to the longitudinal axis of the pipe section.

5. A machine for closing an end portion of a pipe section by progressively swaging a heated end portion thereof comprising, a frame, a rotatable pipe closing head mounted on the frame, power means connected to the head for rotating the same, means for gripping the pipe section against rotation with the heated end portion thereof presented to said head, and with the longitudinal axis of the pipe section located substantially in alignment with the axis of rotation of the head, a pipe closing disk rotatably mounted on said head for rotation therewith and for motion along an axis which is generally radial to the axis of rotation of the head, back-up means mounted on said head on the side oposite side pipe closing disk, said back-up means mounted for motion along a line generally radial to the axis of rotation of said head, said closing disk and back-up means normally residing in a retracted position relative to the axis of rotation of the head, and power means connected in common to said closing disk and back-up means, said power means adapted to shift said back-up means from a retracted position into tracking engagement with the heated end portion of the pipe section to support the same transversely, said power means adapted to shift said closing disk toward and across the axis of rotation of said head, said closing disk having a flat surface movable in a plane at right angles to the longitudinal axis of the pipe section during the motion thereof toward and across the axis of rotation of the closing head, said flat surface adapted to swage the heated portion of the pipe section to the form of an end wall having a substantially flat external surface disposed at right angles to the longitudinal axis of the pipe section.

6. A machine for closing an end portion of a pipe section by progressively swaging a heated end portion thereof comprising, a frame, a rotatable pipe closing head mounted on the frame, power means connected to the head for rotating the same, means for gripping the pipe section against rotation with the heated end portion thereof presented to said head and with the longitudinal axis of the pipe section located substantially in alignment with the axis of rotation of the head, a pipe closing disk rotatably mounted on said head for rotation therewith and for motion along an axis which is generally radial to the axis of rotation of the head, back-up means mounted on said head on the side opposite side pipe closing disk, said back-up means mounted for motion along a line generally radial to the axis of rotation of said head, said closing disk and back-up means normally residing in a retracted position relative to the axis of rotation of the head, and power means connected in common to said closing disk and back-up means, said power means adapted to shift said back-up means from a retracted position into tracking engagement with the heated end portion of the pipe section to support the same transversely, said power means adapted to shift said closing disk toward and across the axis of rotation of said head, said closing disk having a flat surface which is presented to the pipe section, said flat surface leading to a cutting edge formed on the periphery of the disk along the opposite side of the disk, said cutting edge adapted to sever an end portion of the heated portion of the pipe section and said flat surface of the disk adapted to swage the heated portion of the pipe section to the form of an end wall having a substantially flat external surface disposed at right angles to the longitudinal axis of the pipe section.

7. A machine for closing an end portion of a pipe section by progressively swaging a heated end portion thereof comprising, a frame, a rotatable pipe closing head mounted on the frame, a carriage mounted on the frame for motion along a line generally parallel to the axis of rotation of the head, a pipe clamp mounted on said carriage, a first power means connected to the pipe clamp for actuating the same, said pipe clamp adapted to grip the pipe section against rotation with the longitudinal axis of the pipe section disposed substantially in alignment with the axis of rotation of the head, a second power means connected to the carriage for shifting the same along the longitudinal axis of the pipe section, a pipe closing disk rotatably mounted on said head for orbital rotation therewith and for motion relative to the head along a line which is generally radial to the axis of rotation of the head, and a third power means connected to said closing disk for shifting the closing disk along said radial line, said first power means adapted to shift the pipe clamp into clamping engagement with the pipe section, said second power means adapted to shift the carriage and pipe clamp with the pipe section engaged therein from a retracted to an advanced position presenting the heated end portion of the pipe section to said closing head, said third power means thereafter adapted to shift said closing disk from a retracted position toward and across the axis of rotation of said head, thereby to swage the heated end portion of the stationary pipe section to the form of an end wall having a substantially flat external surface disposed at right angles to the longitudinal axis of the pipe section.

8. A machine for closing an end portion of a pipe section by progressively swaging a heated end portion thereof comprising, a frame, a rotatable pipe closing head mounted on the frame, a carriage mounted on the frame for motion along a line generally parallel to the axis of rotation of the head, a pipe clamp mounted on said carriage, a first power means connected to the pipe clamp for actuating the same, said pipe clamp adapted to grip the pipe section against rotation with the longitudinal axis of the pipe section disposed substantially in alignment with the axis of rotation of the head, a second power means connected to the carriage for shifting the same along the longitudinal axis of the pipe section, a pipe closing disk rotatably mounted on said head for orbital rotation therewith and for motion relative to the head along a line which is generally radial to the axis of rotation of the head, a pair of back-up rollers rotatably mounted on said head on the side opposite said pipe closing disk, said back-up rollers mounted for orbital rotation with the head and for motion relative to the head along a line generally radial to the axis of rotation of the head, and a third power means connected in common to said closing disk and back-up rollers for actuating the same said first power means adapted to shift the pipe clamp into engagement with the pipe section, said second power means adapted to shift the carriage and pipe clamp with the pipe section engaged therein from a retracted to an advanced position presenting the heated end portion of the pipe section to said closing head, said third power means adapted to shift said back-up rollers from a retracted position into tracking engagement with the pipe section to support the same transversely, said third power means adapted thereafter to shift said closing disk from a retracted position toward and across the axis of rotation of said head, thereby to swage the heated end portion of the stationary pipe section to the form of an end wall having a substantially flat external surface disposed at right angles to the longitudinal axis of the pipe section.

References Cited by the Examiner

UNITED STATES PATENTS

| | | | |
|---|---|---|---|
| 2,406,059 | 8/1946 | Burch | 29—543 |
| 2,421,629 | 6/1947 | Langos | 29—543 |
| 2,434,737 | 1/1948 | Enghauser | 78—89 |
| 2,568,991 | 9/1951 | Dewey | 113—52 |
| 2,765,608 | 10/1956 | Ford | 113—52 |
| 3,090,263 | 5/1963 | Laverty | 78—89 |

FOREIGN PATENTS 57,184    7/1945    Netherlands.

CHARLES W. LANHAM, *Primary Examiner.*

WILLIAM J. STEPHENSON, *Examiner.*